E. R. WOLCOTT.
METHOD OF PRECIPITATING SUSPENDED MATERIAL FROM FURNACE GASES.
APPLICATION FILED MAR. 19, 1919.
1,329,737.
Patented Feb. 3, 1920.
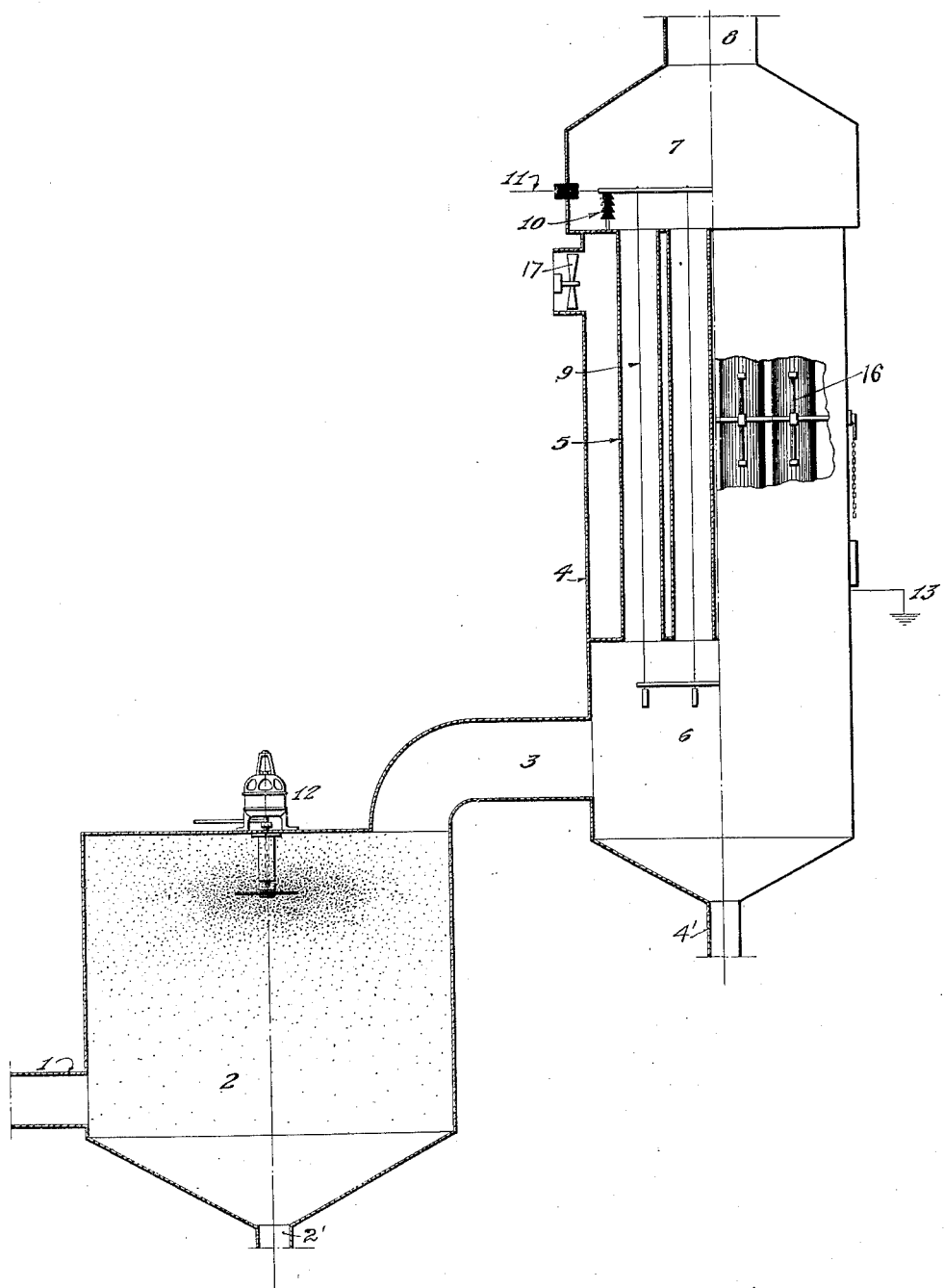
INVENTOR
EDSON R. WOLCOTT
by Arthur P. Knight
ATTORNEY

UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD OF PRECIPITATING SUSPENDED MATERIAL FROM FURNACE-GASES.

1,329,737. Specification of Letters Patent. Patented Feb. 3, 1920.

Application filed March 19, 1919. Serial No. 283,536.

*To all whom it may concern:*

Be it known that I, EDSON R. WOLCOTT, a citizen of the United States, residing at Los Angeles, in the county of Los Angeles and State of California, have invented a new and useful Method of Precipitating Suspended Material from Furnace-Gases, of which the following is a specification.

This invention relates to the collection of dust and fumes from gases passing from smelters, kilns or other furnaces, and is especially applicable in cases where the gases being treated for collecting of dust and fume are at high temperature and the fume is difficult of collection on account of its fineness. In such cases, electrical precipitation has been found to be the most practicable method of collection, but, in some cases, this method of collection is not wholly satisfactory on account of the collected material being of such nature as to interfere with successful precipitation; for example, in the case of material of a non-conducting nature, there is a tendency to an accumulation of the electrical charge upon the deposit, which interferes with further deposition and lowers the voltage that can be maintained in the precipitator without arcing between the electrodes of the apparatus, thereby preventing efficient operation of the precipitator.

In order to overcome the difficulties above referred to and to attain certain other advantages in operation, I supply to the gases sufficient water (in the form of liquid-water, or an aqueous solution of a salt, or steam) in such manner as to humidify the gases to a certain extent. The gases so humidified are passed to an electrical precipitator wherein they are subjected to electrical action to precipitate the fume or fine particles therefrom, the temperature of the gases being reduced sufficiently to cause condensation of some of the water. In recovering such fume as may be deteriorated or made difficult to handle when excess moisture is present, I prefer to provide for only sufficient condensation to make the precipitate or deposit in the precipitator moist enough to present the conductivity required for preventing accumulation of electrical charge thereon, without making the deposit appreciably wet, or in any event, wet enough to form a fluid mass. Such method of operation is of especial advantage when the presence of water in considerable amount would be objectionable; for example, in the treatment of gases containing acid constituents, it is of importance to keep the deposit sufficiently free from moisture to avoid corrosion of the metallic parts of the precipitator. In other cases, such as removing dust and fume from cement gases, it is desirable to avoid the presence of water in sufficient amount to cause caking or settling of the dust, and the same advantage of "dry" precipitation occurs in the collection of any dust or fume having settling or caking properties. I have found that it is possible, by any proper precautions, to provide sufficient moisture in the deposit to prevent accumulation of electric charge, with the objectionable results thereof above stated, while at the same time avoiding the stated disadvantages of a wet precipitate.

The accompanying drawing illustrates an apparatus suitable for carrying out my invention, said drawing being a vertical section of such an apparatus.

In the drawing, a flue for conducting hot gases from a furnace is indicated at 1, said flue leading to a chamber 2, which serves as a humidifying chamber. The outlet flue 3 of chamber 2 communicates with an electrical precipitator 4, which may be of any suitable type, the precipitator or treater being herein shown as comprising a plurality of vertical pipes 5 connected at their lower and upper ends, respectively, to a lower header 6, connected to flue 3, and an upper header 7 connected to stack 8. The pipes 5 constitute collecting electrodes. The discharge electrodes of the electrical precipitator may consist of wires 9 hung from an insulated support 10, which is connected by wire 11 to any suitable means for supplying high tension unidirectional current, the collecting electrodes being grounded, as indicated at 13, to complete the connection.

The humidifying chamber 2 is provided with suitable water supply means, for example, with spray device 12 for distributing, atomizing or spraying water or solution into said chamber so as to saturate the gases with water vapor. The device 12 is shown as a rotary water spray means operating by centrifugal action to eject water in the form of a cloud or spray, but any other suitable device may be used for the purpose. The amount of water supplied in this chamber may be, and preferably is enough to only partially saturate the gases with water vapor, for example, to bring the gases to about 40 to 60% relative humidity.

In passing to or through the electrical precipitator the gases so humidified are cooled sufficiently to cause condensation of more or less of the water vapor therein, such water being condensed to a greater or less extent on the materials suspended in the gases either before or after the precipitation and deposition of said particles on the collecting electrodes, so that the deposit collected on the collecting electrodes may be caused to contain sufficient water to render it conducting and to continuously carry off electricity received thereby. By this means I avoid accumulation of electrical charges on the deposit and resulting interference with the operation of the treater by reason of lowering of arcing voltage resulting from local charges on the deposited material. In general the walls of the electrical precipitator will be considerably cooler than the gases passing through the precipitator pipe or flues, and in some cases the process may be so carried out that little, if any, condensation to fog or cloud takes place in the gases, but the walls are maintained sufficiently cool to cause condensation of moisture in the deposit in contact with the walls, and in such cases, the walls may be cooled by radiation or by circulation of external air, (assisted, if necessary, by blower means 17), or by other suitable cooling means, if necessary. The amount of water condensed in or on the collected material may be merely sufficient to render the same conducting (a mere trace of water being sufficient for this purpose), and means, such as suitable hammers 16, may be provided for removing the deposit from the collecting electrodes, by hammering or otherwise.

In any case, it is essential in carrying out my invention, to maintain the deposit at a temperature of not more than 100° C. when working at approximately atmospheric pressure so that there will be some condensation of water vapor, resulting in a moist precipitate, but the temperature of the gases flowing through the treater may be in excess of 100° C. in case surface condensation on the walls of the treater and the adjacent deposit is depended on for humidification of the deposit. In order to insure collection of the precipitated material in sufficiently dry condition to avoid the presence of appreciable water therein, or in any event, to avoid the presence of sufficient water to produce corrosive or caking actions, as hereinafter set forth, it is desirable to maintain the temperature of the deposit, or of the gases, or both, above the dew point, but below 100° C. when working at atmospheric pressure so that the moisture collected on the deposit is limited in the manner stated. In this case, the collection of moisture on or in the deposit may be due wholly or mainly to adsorptive action of the precipitated material rather than to condensation by depression of temperature below the dew point.

The term "moist precipitate", as herein used, applies to any precipitate in which there is sufficient moisture to enable discharge of electricity therefrom to the grounded collecting electrode by reason of moisture in the precipitate, and in some cases, the amount required for this purpose may not be perceptible to the eye or to the touch.

My present invention is particularly intended for use in connection with the precipitation of material wherein the presence of water in considerable amount would be objectionable, either by reason of the corrosive action, which would result therefrom on the collecting surfaces, or by reason of caking of the precipitated material on the collecting surfaces, or for other reasons. For example, in the precipitation of dust and fume from smelter gases containing more or less acid constituents in the gases or in the fume, the presence of any considerable amount of water in the precipitated material has been found to be objectionable on account of the rapid corrosion which results on the metallic surfaces in the precipitator, particularly the metallic collecting electrodes, and, in such cases, it is essential to keep the amount of moisture in the precipitate below that at which objectionable corrosion takes place. Moreover, in some cases, the deposited material is of such nature that in the presence of considerable water, it tends to form an adhered deposit, or cake, or scale, on the collecting electrode surfaces, this being particularly the case with cement dust or fume; in such cases, it is desirable to maintain the deposit sufficiently dry to prevent caking or adhering thereof on the collecting electrode surfaces, and to keep the deposit in a granular or finely divided condition, so as to enable its dislodgment from the collecting electrodes by rapping, or knocking, or other mechanical operations.

For humidifying the gases fresh water may be used, or, if desired, a solution may be used consisting of the residual liquor obtained by leaching the precipitated material with water, or solution, and separating one or more of the constituents thereof by evaporation, cooling, or otherwise.

Suitable means are provided for drawing off or carrying away the collected material, thus the humidifying chamber 2 may be provided with an outlet 2' at its bottom for carrying away any material collecting in said chamber and the precipitator 4 may be provided with an outlet 4' at the bottom of the lower header thereof for removal of the material which collects in the lower header.

What I claim is:

1. The process of separating solid suspended non-conducting particles from hot furnace gases, which consists in supplying water to such gases to humidify them to a condition of partial saturation and to partially cool the gases, then further cooling the gases, and precipitating the particles suspended in the gases by electrical action, the temperature of the precipitated material and the relative humidity of the gases being controlled in such manner as to provide sufficient moisture in the precipitated material to prevent accumulation of electric charge thereon, but not sufficient moisture to make the deposit corrosive or adherent to the surfaces on which it is precipitated.

2. The process of separating solid suspended non-conducting particles from hot gases, which consists in humidifying the gases, cooling the gases to a temperature below 100° C., and passing the gases through an electric field for precipitation of the suspended material therefrom, the temperature of the gases during such precipitation being maintained above the dew point but below 100° C., so as to cause the precipitated material to become sufficiently conducting to prevent accumulation of electric charge thereon without making the deposit appreciably wet.

In testimony whereof I have hereunto subscribed my name this 19th day of February, 1919.

EDSON R. WOLCOTT.